(12) United States Patent
Konan et al.

(10) Patent No.: US 11,294,743 B2
(45) Date of Patent: Apr. 5, 2022

(54) FIRMWARE EVENT TRACKING FOR NAND-BASED STORAGE DEVICES, AND METHODS AND INSTRUCTION SETS FOR PERFORMING THE SAME

(71) Applicant: SK hynix Inc., Gyeonggi-do (KR)

(72) Inventors: Andrei Konan, Minsk (BY); Alexander Zapotylok, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 125 days.

(21) Appl. No.: 16/163,189

(22) Filed: Oct. 17, 2018

(65) Prior Publication Data
US 2019/0129774 A1 May 2, 2019

Related U.S. Application Data

(60) Provisional application No. 62/577,571, filed on Oct. 26, 2017.

(51) Int. Cl.
| | |
|---|---|
| *G06F 11/00* | (2006.01) |
| *G06F 11/07* | (2006.01) |
| *G06F 11/34* | (2006.01) |
| *G06F 12/02* | (2006.01) |
| *G06F 9/54* | (2006.01) |

(Continued)

(52) U.S. Cl.
CPC ............ *G06F 11/008* (2013.01); *G06F 9/542* (2013.01); *G06F 11/079* (2013.01); *G06F 11/0775* (2013.01); *G06F 11/0778* (2013.01); *G06F 11/3034* (2013.01); *G06F 11/3476* (2013.01); *G06F 12/0246* (2013.01); *G06F 16/9024* (2019.01); *G06F 2201/835* (2013.01); *G06F 2201/86* (2013.01); *G06F 2212/7203* (2013.01)

(58) Field of Classification Search
CPC .......... G06F 3/0619; G06F 2212/1032; G06F 11/1471
See application file for complete search history.

(56) References Cited

U.S. PATENT DOCUMENTS

| | | | | |
|---|---|---|---|---|
| 2013/0111079 | A1* | 5/2013 | Ben Abdallah | G06F 13/28 710/23 |
| 2016/0344834 | A1* | 11/2016 | Das | G06F 11/3476 |
| 2019/0102262 | A1* | 4/2019 | Sukhomlinov | G06F 11/1448 |

FOREIGN PATENT DOCUMENTS

| | | |
|---|---|---|
| CN | 105612503 A | 5/2016 |
| KR | 10-1025354 B1 | 3/2011 |
| KR | 101596652 | 2/2016 |

OTHER PUBLICATIONS

Chang Yao, "Adaptive Logging: Optimizing Logging and Recovery Costs in Distributed In-memory Databases", 2016,SIGMOD'16, p. 1119-1134 (Year: 2016).*

(Continued)

*Primary Examiner* — Matthew M Kim
*Assistant Examiner* — Michael Xu
(74) *Attorney, Agent, or Firm* — IP & T Group LLP

(57) ABSTRACT

Devices, methods and instruction sets are provided for performing operations with respect to analyzing firmware. A firmware event tracker includes a tracker event log in which events occurring during execution of firmware are recorded as event-items and stored in volatile. Flushing of event-items from volatile memory to non-volatile memory via a flush strategy and flush access path. In other aspects, the stored tracker event log, is used for performing failure analysis of the firmware.

10 Claims, 13 Drawing Sheets

(51) Int. Cl.
  *G06F 16/901* (2019.01)
  *G06F 11/30* (2006.01)

(56) References Cited

OTHER PUBLICATIONS

Ioannis Parnassos, "SoCLog: A real-time, automatically generated logging and profiling mechanism for FPGA-based Systems On Chip", 2016, 2016 26th International Conference on Field Programmable Logic and Applications (FPL), https://ieeexplore.ieee.org/document/7577372 (Year: 2016).*
Office Action issued by the Chinese Patent Office dated Nov. 15, 2021.

* cited by examiner

FIRMWARE EVENT TRACKING FOR NAND-BASED STORAGE DEVICES, AND METHODS AND INSTRUCTION SETS FOR PERFORMING THE SAME

CROSS-REFERENCE TO RELATED APPLICATION

This application claims the benefit of U.S. Provisional Application No. 62/577,571, filed Oct. 26, 2017, the entire contents of which are incorporated herein by reference.

BACKGROUND

1. Field

Embodiments of the present disclosure relate to a firmware event tracker for NAND-based storage devices, and methods of performing firmware event tracking for such devices, including tracking and logging events occurring during execution of firmware and analyzing the logged events.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

An SSD may include flash memory components and a controller, which includes electronics that bridge the flash memory components to the SSD input/output (I/O) interfaces. An SSD controller can include an embedded processor that executes functional components such as firmware. SSD functional components are typically device specific, and in most cases, can be updated.

The two main types of flash memory components are named after NAND and NOR logic gates. The individual flash memory cells exhibit internal characteristics similar to those of their corresponding gates. A NAND-type flash memory may be written to and read from in blocks (or pages) which are generally much smaller than the entire memory space. A NOR-type flash allows a single machine word (byte) to be written to an erased location or read independently. A NAND-type flash memory operates primarily in memory cards, USB flash drives, solid-state drives, and similar products, for general storage and transfer of data.

The process of producing NAND-based storage devices is involved. Such process includes a number of principal steps including component design (NAND, system-on-chip (SoC), firmware, board, etc.), component integration, product operation stabilization, preparation of engineering samples and customer samples, preparation of a release candidate, mass production, and return material authorization (RMA) support. Failure analysis (FA) of various components in also part of the process. One such component on which FA is performed is firmware.

Existing FA capabilities for firmware include Joint Test Action Group (JTAG) debuggers, universal asynchronous receiver-transmitter (UART) serial port output, and internal logging (statistical and flow types). While each of these techniques has advantages, each also has disadvantages.

In this context embodiments of the present invention arise. More specifically, the present invention provides improvements in firmware event trackers and tracking methods for NAND-based storage devices that enhance FA of supplier and customer side issues.

SUMMARY

Aspects of the present invention include computer-readable storage mediums storing sets of instructions for performing operations, methods for performing the operations, and components for implementing execution of the instruction sets and methods.

In one aspect, a non-transitory computer-readable storage medium stores a set of instructions for directing a device to perform operations for tracking events with respect to firmware. The set of instructions comprises instructions for creating a tracker event log including multiple event-items pertaining to events occurring during execution of the firmware, each of the event-items including a timestamp, a unique identifier and at least one parameter describing the corresponding event; storing the event-items in volatile memory in accordance with an array-based list structure; establishing a flush strategy for flushing event-items from the volatile memory to non-volatile memory; establishing a flush access path for each of the event-items for flushing the corresponding event-item from the volatile memory to the non-volatile memory; and selectively flushing event-items from the volatile memory to the non-volatile memory in accordance with the established flush strategy and using established flush access path for the event-item to be flushed.

In another aspect, a non-transitory computer-readable storage medium stores a set of instructions for using a firmware event tracker stored in a NAND device and that includes multiple event-items pertaining to events that occurred during execution of firmware in a storage device. Each of the event-items includes a timestamp, a unique identifier and at least one parameter describing the corresponding event. The event-items are arranged in groups, each having its own group identifier. The set of instructions comprises instructions for parsing source and header files in the tracker event log to detect and define all unique identifiers, detect and define all group identifiers, and build and define mapping between unique identifiers and group identifiers; generating a file with description of all parsed event-items entered in the tracker event log; and generating index files with all source definitions.

In still another aspect, a non-transitory computer-readable storage medium stores a set of instructions for directing a host device to perform failure analysis of firmware using a firmware event tracker stored in a NAND memory device and that includes multiple event-items pertaining to events that occurred during execution of firmware in a storage device. Each of the event-items includes a timestamp, a unique identifier and at least one parameter describing the corresponding event. The event-items being arranged in groups, each having its own group identifier. The set of instructions comprising instructions for establishing communication between the host device and the NAND memory device; selecting individual event-items using their respective unique identifiers or one or more groups of event-items using their respective group identifiers; reading the selected event-items; parsing data of the selected event-items; sorting the selected event-items by timestamps; and analyzing details of the sorted event-items to perform failure analysis on the firmware.

Additional aspects of the present invention will become apparent from the following description.

DETAILED DESCRIPTION

Figure 1:
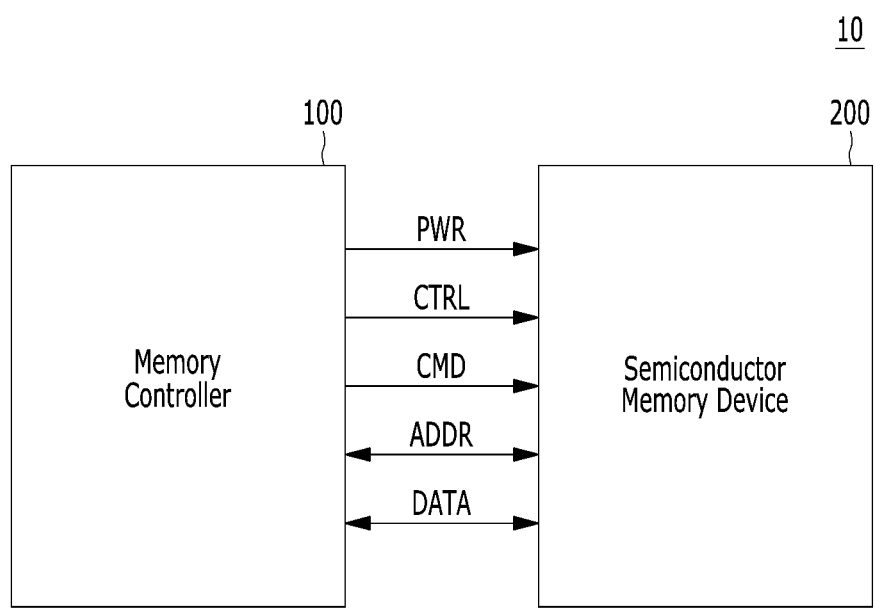
FIG. 1 is a block diagram illustrating a memory system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a composition of matter; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram schematically illustrating a memory system in accordance with an embodiment of the present invention.

Referring FIG. 1, the memory system 10 may include a memory controller 100 and a semiconductor memory device 200, which may represent more than one such device. The semiconductor memory device(s) 200 may be flash memory device(s), particularly of the NAND-type.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output (I/O) lines. The semiconductor memory device 200 may receive power PWR through a power line and a control signal CTRL through a control line. The control signal CTRL may include a command latch enable (CLE) signal, an address latch enable (ALE) signal, a chip enable (CE) signal, a write enable (WE) signal, a read enable (RE) signal, and the like.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to form a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

In another embodiment, the memory system 10 may be provided as one of various components in an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

Figure 2:
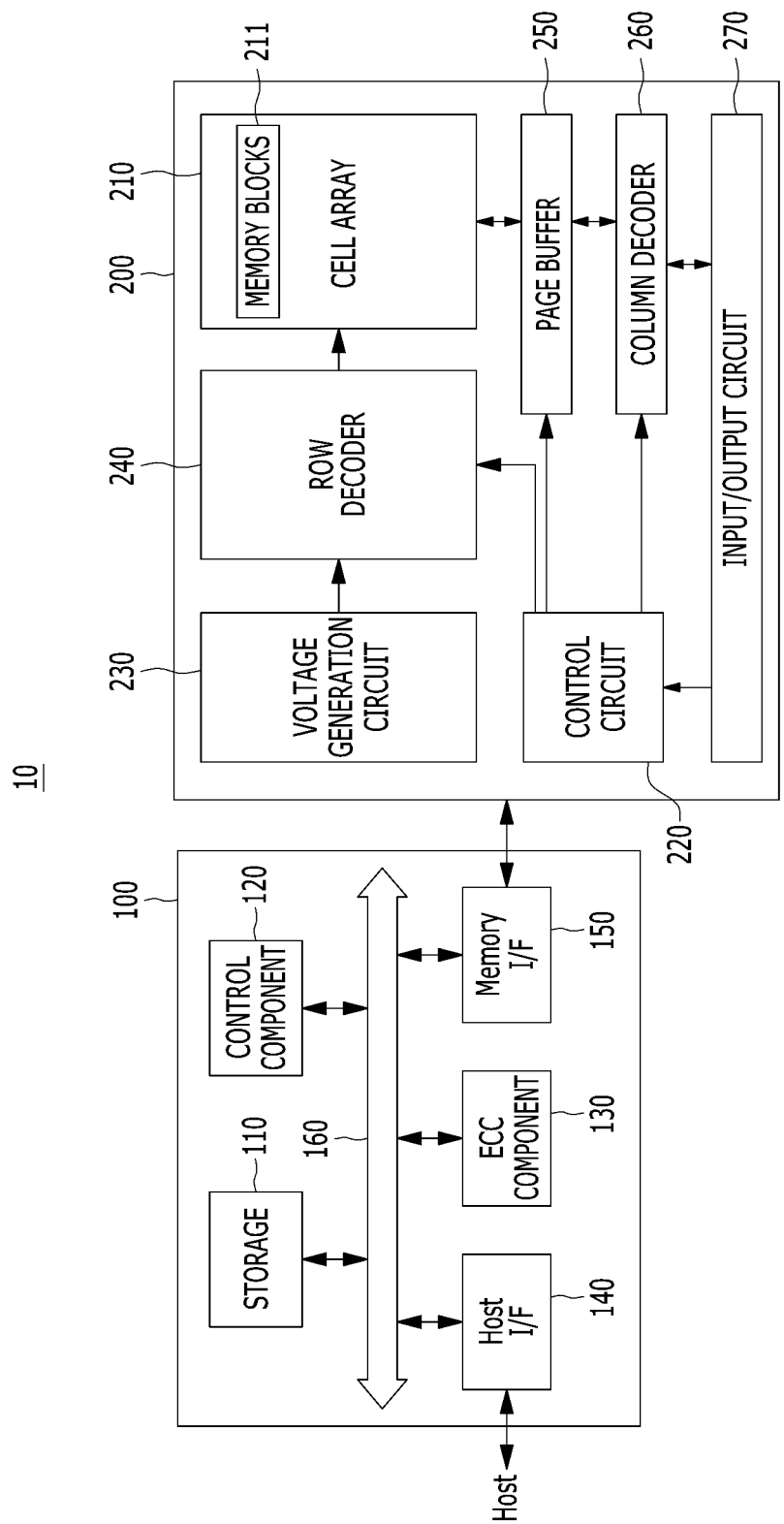
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, and/or a digital video recorder and a digital video player. In some embodiments, the host device may include a portable electronic device such as a mobile phone, a smart phone, an e-book, an MP3 player, a portable multimedia player (PMP), and/or a portable game player.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In some embodiments, the ECC component 130 may perform an error correction operation based on a coded modulation such as a low-density parity-check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). As such, the ECC component 130 may include all circuits, systems or devices for suitable error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), an integrated drive electronics (IDE), and non-volatile memory express (NVMe).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, which may be in the form of an array of page buffers, a column decoder 260, and an input/output circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks.

Figure 3:
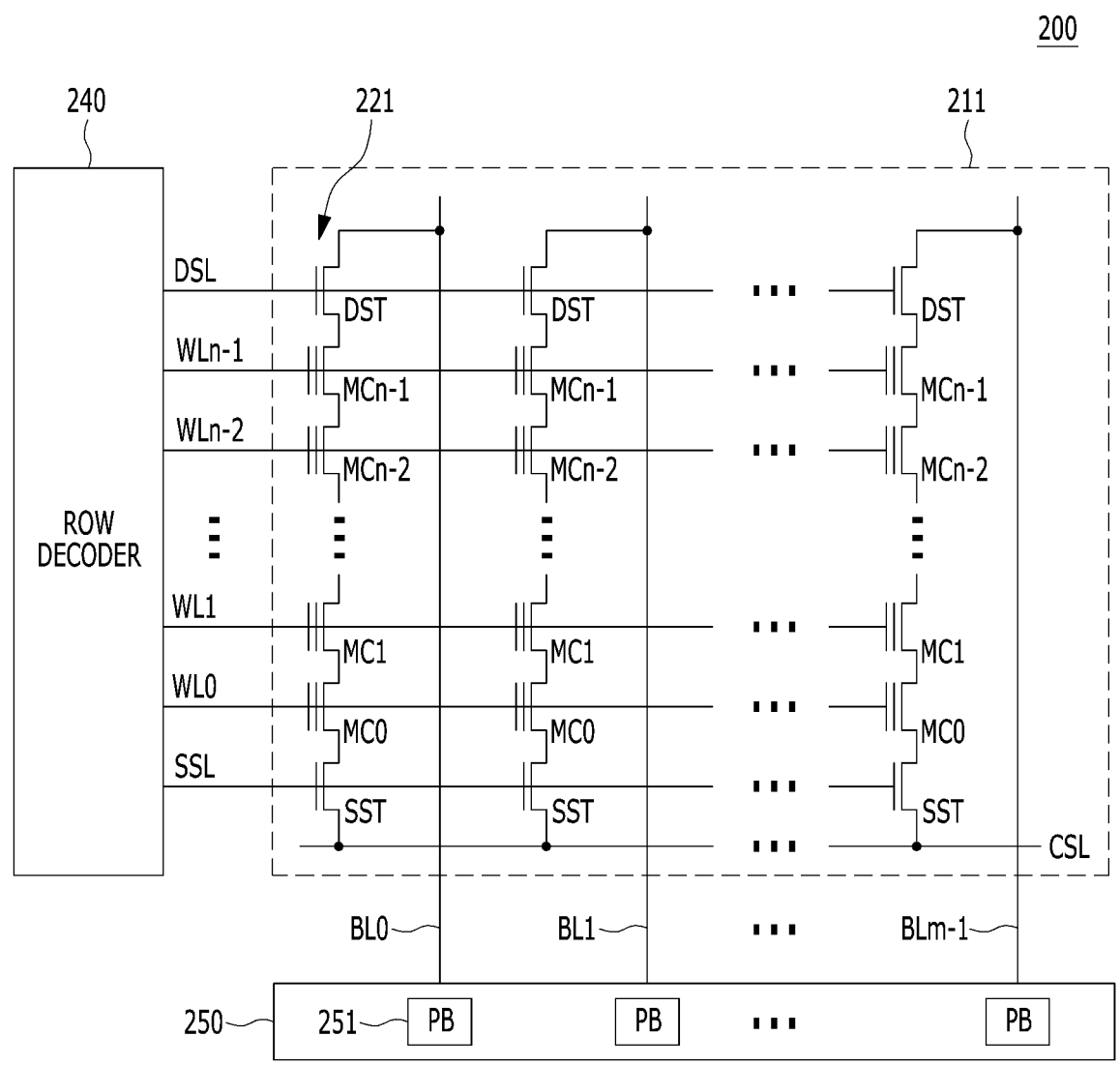
FIG. 3 is a circuit diagram illustrating a memory block of a memory device of a memory system in accordance with an embodiment of the present invention.

The page buffer 250 may be in electrical communication with the memory cell array 210 through bit lines BL (shown in FIG. 3). The page buffer 250 may pre-charge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit/receive data to/from the input/output circuit 270.

The input/output circuit 270 may transmit to the control circuit 220 a command and an address, received from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 200 shown in FIG. 2.

Referring to FIG. 3, the exemplary memory block 211 may include a plurality of word lines WL0 to WLn-1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm-1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn-1 may be serially coupled between the selection transistors DST and SST. Each of the memory cells may be formed as a multi-level cell (MLC) storing data information of multiple bits.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL.

Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm-1. The page buffers 251 may operate in response to page buffer control signals. For example, the page buffers 251 my temporarily store data received through the bit lines BL0 to BLm-1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

Aspects of the present invention are directed to improvements in firmware event trackers for NAND-based storage devices, as well as related methods and instruction sets for tracking events, creating a tracker event log, and using such log to evaluate, e.g., perform failure analysis (FA) on, the firmware.

An FA approach using JTAG actually stops device firmware execution and provides the richest abilities to control execution flow (memory and call stack overview, instruction stepping, breakpoint set, etc). JTAG is very helpful in a failure scenario that is strictly defined or can be localized with breakpoints. Drive performance usually degrades when JTAG is connected and breakpoints are set. Also, JTAG debugging is usually not applicable after the device is manufactured for various reasons, e.g., disabled interface, inability to reach the debugging interface, or physical inability to reach failed sample and connect JTAG. Drive failures related to high pressure on firmware or hardware modules at high operation may not even happen when JTAG is connected, and overall drive performance decreases.

Debugging over serial port is usually applicable for in-house device stabilization in which a significant amount of information is being output to the terminal. However, a production version of a device usually has a small serial port output due to performance limitation. Operation frequencies of hardware, i.e., NAND device and host interface, are usually much higher than a serial port hardware interface. One serial port debugging bottleneck is output dump storage. Data outputted by the drive over serial flash should be stored externally. It should done by an external software tool with the help of a physical serial port connection chain. The serial port along with JTAG can be disabled in a production version of a device to limit access to the device's hardware components and internal operations.

Debugging with internal logging entails storing device events inside the device itself with the ability to extract them over a host interface. A log type can be classified as either statistical or flow. The former captures statistics of the occurrences of internal events, while the latter captures events with timestamps and parameters. Statistical logs are useful for a generic overview during device FA, and can narrow down a problematic scenario very quickly. For example, incremented statistics for a device being over temperature gives a clue on a possible root cause of failure, but it does not give an exact timestamp, i.e., when the event happened and under what circumstances. Flow logs, on the other hand, provide an entire history of events that happened on the device. A shortcoming of flow logs, though, is memory usage and performance. Statistical logs are usually implemented with simple increments of global variables and can be compactly stored. Flow logs require more space, since they utilize timestamps and custom parameters. Flow logs usually support a log overwrite mechanism, as memory resources are limited, and when there is no more space for new logs, the oldest are deleted to free-up memory.

Embodiments of the present invention provide improvements in firmware event trackers, including tracking events with respect to firmware using a tracker event log, which then may be used to analyze the firmware, i.e. perform FA. In some embodiments, such a firmware event tracker is light-weight and highly automated and has minimal performance impact. The inventive firmware event tracker is well suited for multi-core NAND-based storage devices. Advantageously, the techniques of the firmware event tracker enhance FA of supplier and customer side issues.

Tracker Event Log

Figure 4:
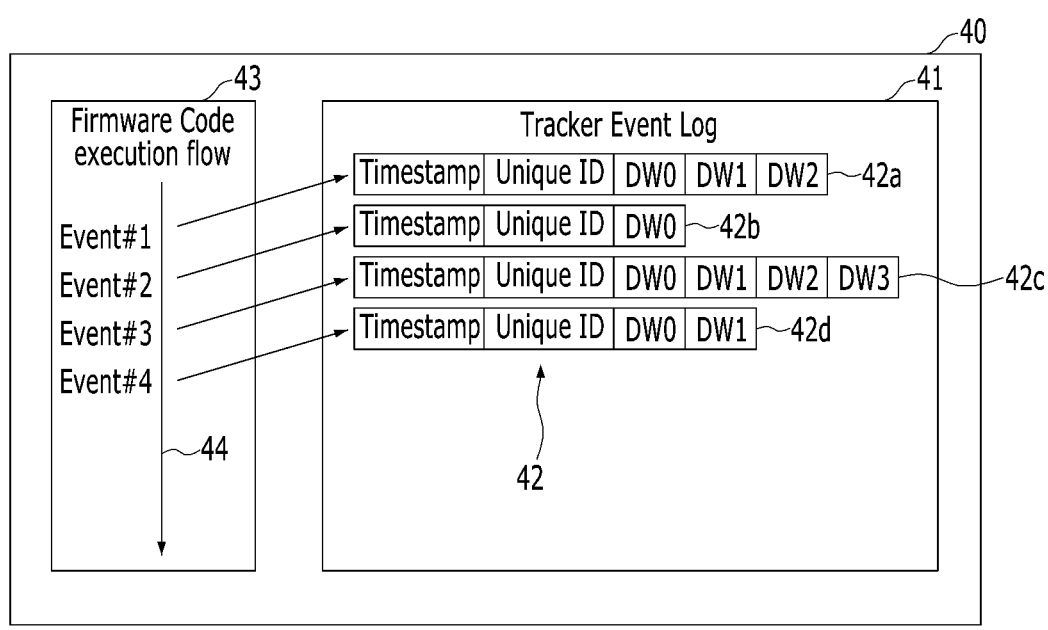
FIG. 4 is a schematic diagram showing a firmware event tracker for a memory device of a memory system in accordance with an embodiment of the present invention.

FIG. 4 is a schematic illustration of a firmware event tracker 40, showing creation of a tracker event log 41. The tracker event log includes multiple event-items 42, for example, event-items 42a-42d. Each of the event-items 42a-42d is defined by a timestamp, a unique identifier (ID), and one to five custom parameters. A custom parameter may identify a specific channel, die, block, page, and/or column. Each of the custom parameters may be of a double word (DWORD) type. In the illustrated embodiment, event-item 42a has three custom parameters (DW0, DW1, DW2), event-item 42b has one custom parameter (DW0), event-item 42c has four custom parameters (DW0, DW1, DW2, DW3), and event-item 42d has two custom parameters (DW0, DW1).

The event-items 42 are generated from execution of the firmware. An exemplary firmware code execution flow 43 is illustrated with a timeline 44 of events respectively corresponding to the event-items 42. For example, Event #1, Event #2, Event #3 and Event #4 in the timeline 44 respectively correspond to event-items 42a, 42b, 42c and 42d.

Tracker Storage

Figure 5:
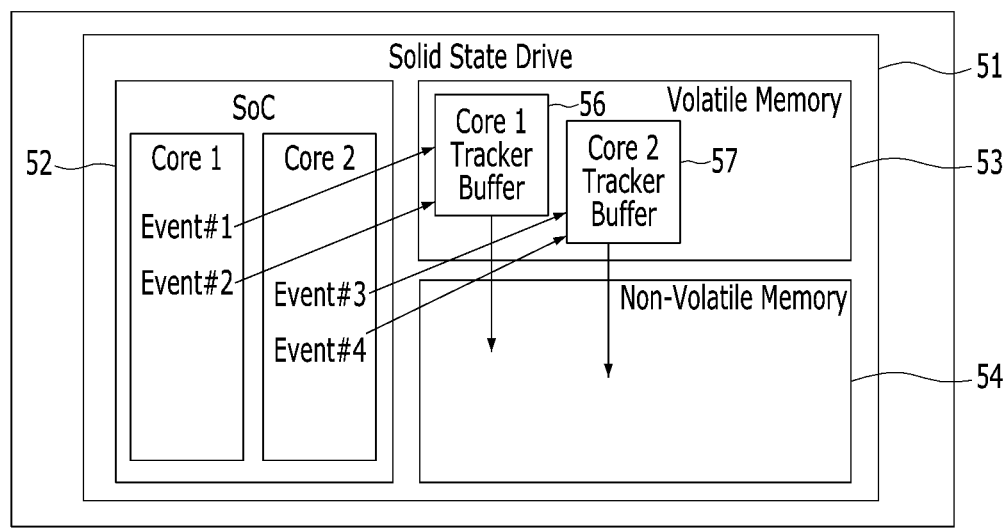
FIG. 5 is a schematic diagram showing an exemplary multi-core solid state drive (SSD) in connection with storage of tracked event-items in accordance with an embodiment of the present invention.

Referring to FIG. 5, an exemplary multi-core solid state drive (SSD) 51 is illustrated to show storage of tracker events. The SSD 51, which may be a NAND-based device, includes a system-on-chip (SoC) 52 with multiple cores, e.g., Core 1 and Core 2. Each of the events pertain to a specific one of the cores. In the illustrated embodiment, Event #1 and Event #2 (and their respective event-items 42a and 42b) pertain to Core 1, while Event #3 and Event #4 (and their respective event-items 42c and 42d) pertain to Core 2.

The SSD 51 further includes volatile memory 53 and non-volatile memory 54. The volatile memory 53 may be external or internal and may be implemented as a tightly-coupled memory (TCM), a dynamic random-access memory (DRAM) or static random-access memory (SRAM). The non-volatile memory 54, which may also be internal or external, may be a NAND-type flash memory. The volatile memory 53 includes a tracker buffer for each of the multiple cores. Thus, in the illustrated embodiment, volatile memory 53 includes Core 1 tracker buffer 56 and Core 2 tracker buffer 57.

To meet SSD performance and quality-of-service (QoS) requirements, event-items 42 representing tracked events are first stored in the volatile memory 53. Then, as the volatile memory 53 becomes full, the event-items 42 are flushed to the non-volatile memory 54.

In connection with this storage process, each event-item maintains association with the core to which it pertains. Thus, the event-items 42a and 42b for Events #1 and #2 respectively, each pertaining to Core 1, are initially stored in Core 1 tracker buffer 56, and event-items 42c and 42d for Events #3 and #4 respectively, each pertaining to Core 2, are initially stored in Core 2 tracker buffer 57. As the volatile memory 53 becomes full, the event-items 42 stored therein are flushed to the non-volatile memory 54.

Figure 6:
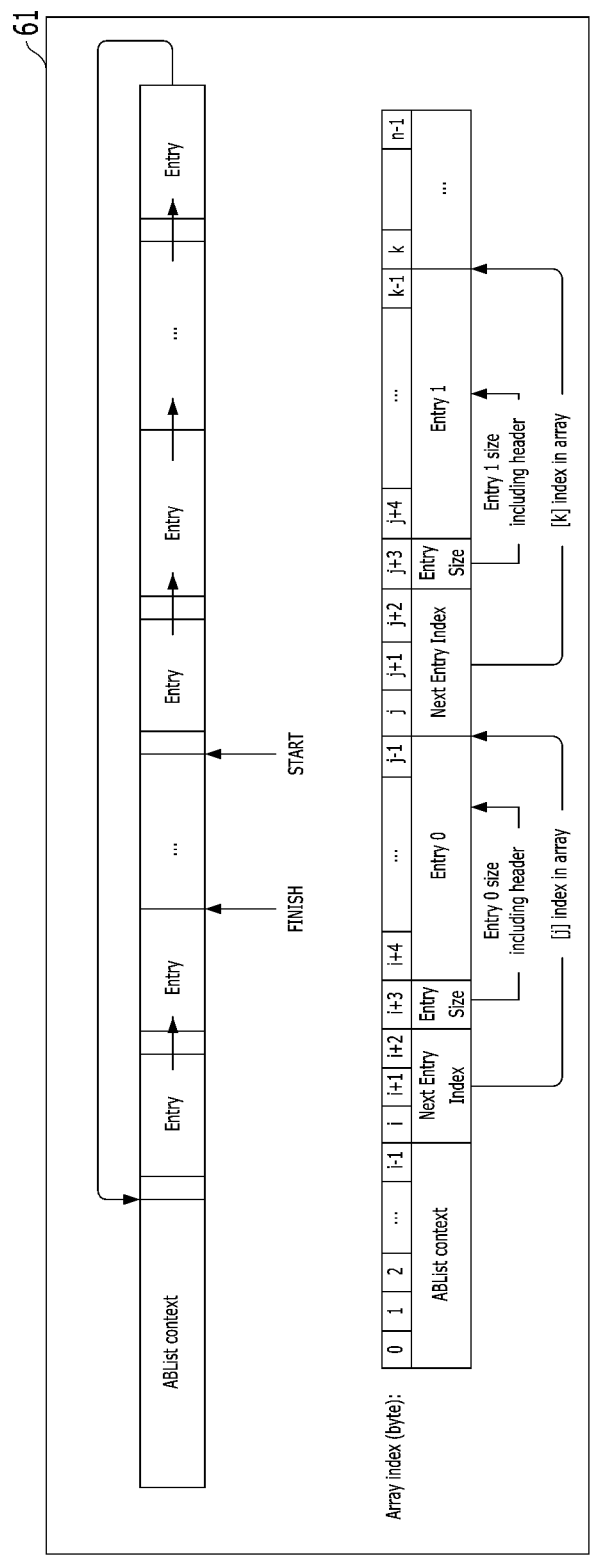
FIG. 6 shows an ABList data structure in accordance with an embodiment of the present invention.

Tracker event-items 42, with their custom format (timestamp, unique ID, and parameters), are stored initially in the volatile memory 53. To more efficiently utilize the buffers, event-items 42 are stored in the volatile memory 53 using an array based list (ABList) 61. The ABList data structure, which is shown in FIG. 6, is a unidirectional linked list in which each entry has a header with entry length and pointer to the next entry in the list. The entry length in the ABList entry header is needed because each of the tracker buffers is cyclic. The tracker system configuration allows for buffer overwrite in a cyclic manner, e.g., last in, first out (LIFO). However, to avoid loss of event-items 42, there is an option to forbid overwrite and flush the tracker buffers, as they become full, to non-volatile memory. The flush strategy or policy, which may be based on buffer fullness or by request, may be set up as part of the tracker system configuration. The stored event-items 42 stored are also flushed from volatile memory 53 to non-volatile memory 54 upon occurrence of a critical event such as power loss.

Figure 7:
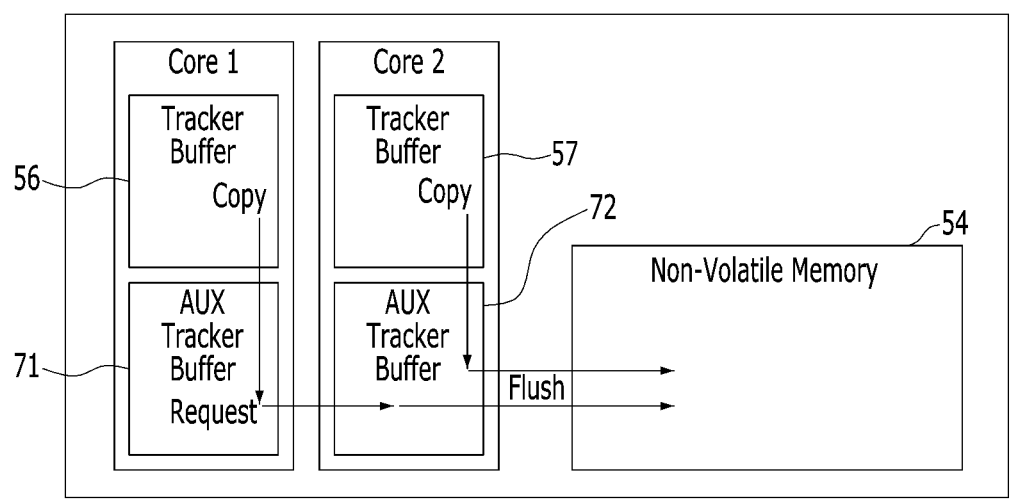
FIG. 7 is a schematic diagram showing flushing of event-items to non-volatile memory in accordance with an embodiment of the present invention.

While a tracker buffer 56, 57 is being flushed it should be intact, that is, preserved from new event-items being stored therein. To achieve this, while still allowing newly tracked events to be logged as event-items 42, auxiliary buffers are used. Referring to FIG. 7, there is an auxiliary tracker buffer 71 associated with the tracker buffer 56, which may be considered a main buffer, and an auxiliary tracker buffer 72 associated with the tracker buffer 57, which may be considered a main buffer. The main-aux buffer pair 56, 71 is associated with Core 1, and the main-aux buffer pair 57, 72 is associated with Core 2.

During the flush operation, event-items 42 stored in the main buffers 56, 57 are copied and the copies are transferred to the auxiliary buffers 71, 72 respectively. The auxiliary buffers 71, 72 are then flushed to non-volatile memory 54. Use of the auxiliary buffers 71, 72 allows continuous logging of event-items 42 while not interrupting the flush operation.

Some cores of an SSD SOC may not have direct access to the non-volatile memory 54, in which case a "mailbox" approach to a core with direct access is employed to store the content of the auxiliary buffer(s) of a core without direct access. Different cores inside an SSD have different usages and peripherals. For example, one core may be in charge of host interface operation, such as SATA or NVMe, and another core may be in charge of operation with the flash memory. In order to perform its duties, each core should have several functionality-specific hardware peripherals. In order to minimize SOC size, each peripheral is typically mapped to only one core. In the present embodiment, Core 1 may be for host operation, and Core 2 may be for NAND operation. In that case, Core 1 cannot by itself store data to NAND as it has no access to flash peripherals. Thus, Core 1 performs a mailbox request to Core 2 requesting Core 2 to store the buffer contents of Core 1 to the non-volatile memory 54, e.g., NAND.

An SSD device typically uses non-straightforward methods to store data in non-volatile memory, i.e., NAND, compared to a hard disk drive (HDD). The complexity comes from NAND specific operations, such as page-based programming and block-based erasing. An SSD saves meta information (system data) to maintain its operation. A portion of the system data is also stored in NAND. Typically, a unified approach is used to store system data in order to save code and NAND space. However, storing a tracker event log together with other system data has certain shortcomings. In the event that system storage breaks or becomes disabled (as bugs can occur anywhere in code), an appended tracker event log is not likely recoverable. Also, before using a tracker event log stored with other system data, initialization of storage is needed; thus such initialization process cannot be profiled with the tracker. Further, storing a tracker event log with other system data affects the general system area state, which should be minimized.

Figure 8:
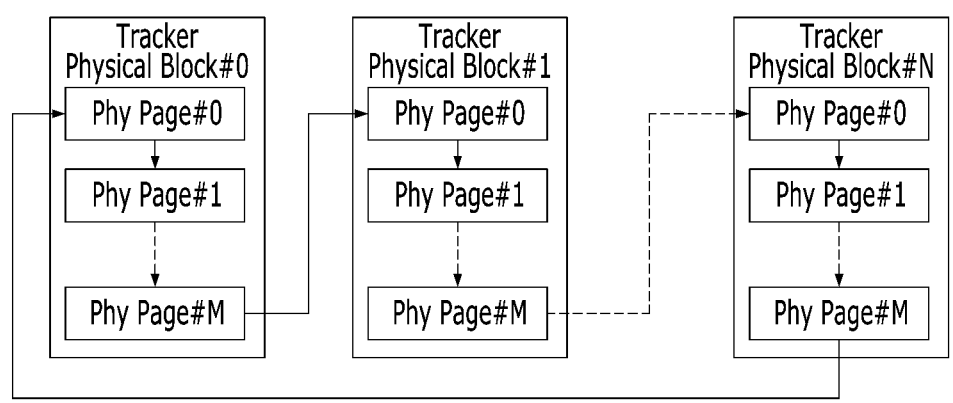
FIG. 8 is a schematic diagram showing storage of a tracker event log in a NAND memory device in accordance with an embodiment of the present invention.

Accordingly, embodiments of the present invention take a different approach. The set of physical blocks of the non-volatile memory 54, i.e., NAND, is controlled for storage of the tracker event log 41. Compared to host data, the number of write operations to the NAND blocks is significantly less; thus, the write performance for large amounts of data is not a factor. As shown in FIG. 8, a relatively simple algorithm may be utilized to store the tracker event log 41 in the non-volatile memory 54, i.e., NAND, block-by-block, page-by-page.

Each power-on, the NAND storage blocks are independently scanned. A binary search is used for each NAND physical block. Using a timestamp in each page, the storage flushing sequence may be recovered.

Tracker Events in Firmware Code

Advantageously, the firmware event tracker 40, configured as explained above, is easy to use for the user, e.g., firmware engineer. There is an event logging point in the firmware code, as shown in the exemplary code listing below, to use the tracker. In the TRACK_DEBUG command, channel, die, block, page, column are the custom parameters, e.g., DW0, DW1, DW2, DW3, DW4.

```
int NAND_ProgramPage_ErrorRecovery(int channel, int die, int block,
int page, int column)
{
    TRACK_DEBUG(PROGRAM_PAGE, NAND_GROUP, channel,
    die, block, page, column);
    NAND_ProgramPage_StopCommanExectuion(1);
```

The firmware engineer provides the following attributes to the tracker call: (1) Verbose Level (_INFO, _DEBUG, _WARNING, _ERROR); (2) Unique literal Event ID (PROGRAM_PAGE); (3) Unique literal Group ID (NAND_GROUP); (4) Custom event parameters (channel, die, block, page, column), which may correspond to DW0, . . . , DW4 described in connection with FIG. 4.

The firmware event tracker 40 has a system configuration defined inside the firmware code that reflects system verbose level. Tracker calls with lower verbose level than that of the system are compiled out and not used during execution.

The single code line, such as that in the listing above, may cause compilation failure due to undefined literal strings. This issue is resolved by running a prebuild script, explained below, before compilation that will parse all header and source files and define tracker unique literals in index header and source files while including them into the firmware build.

Tracker events may be classified and grouped according to classification for easier management. Particular groups can be disabled during compile or run time.

The number of tracker event parameters is dynamic; the firmware engineer may provide from 0 to a maximum number that is set according to system configuration parameters. Tracker volatile storage is optimized to store data in compacted manner.

Tracker Prebuild Parser

To simplify tracker usage, a prebuild script is launched before the build to parse source and header files in order to (1) detect and define all tracker IDs; (2) detect and define all tracker groups; and (3) build and define mapping (ID vs. group) to have the ability to switch each group on or off for logging during firmware runtime.

Figure 9:
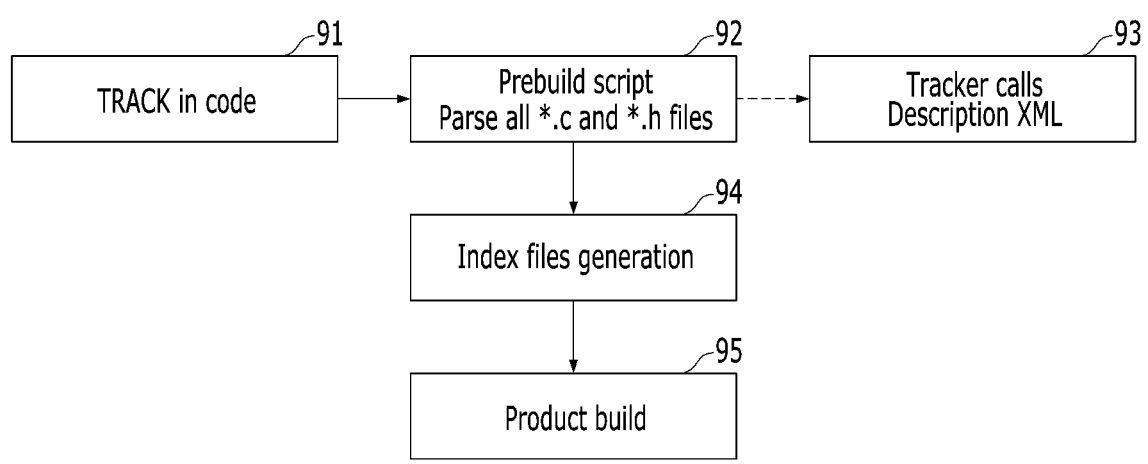
FIG. 9 is a flow diagram showing operations associated with a prebuild script in accordance with an embodiment of the present invention.

FIG. 9 shows an exemplary tracker prebuild flow. Tracker entries are added to firmware code in operation 91. The prebuild script is launched in operation 92 to parse all *.c and *.h files. The tracker entries may be added to the firmware code randomly, so prebuild parsing may detect IDs and groups in different orders in different firmware builds. In order to define unique enumeration number for tracker IDs and groups regardless of parsing order, a hash of the literal name is used.

In response to launch of the prebuild script (operation 92), tracker calls, e.g., description xml, are made in operation 93 and index files are generated in operation 94. Following generation of the index files (operation 94), the flow proceeds to firmware (product) build in operation 95.

Results of the tracker prebuild process are (1) xml file with description of all parsed tracker entries, i.e., event-items; and (2) tracker index files with all source definitions to be included into the firmware build.

Tracker mapping for ID vs group will be a rather sparse matrix. In order to minimize storage for the map, a bit-based 2D array is used, such as that shown below.

$$\text{Position } [i, j] = \begin{cases} 0, \text{ Group } i \text{ does not include } ID \ j \\ 1, \text{ Group } i \text{ does include } ID \ j \end{cases}$$

Tracker Analysis

In order to perform failure analysis (FA) using the firmware event tracker 40 including the tracker event log 41 and its associated tracker event-items 42, a vendor specific protocol is implemented over a device/host interface, which provides the ability to read tracker buffers from the non-volatile memory, i.e., NAND. When all data related to the event-items 42 is read, such data is parsed according to the tracker layout and event-items 42 are sorted by timestamps. Parsed data can be exported to a csv file and analyzed in detail.

During drive runtime, external software tools can be used to manage system configuration of the firmware event tracker 40. Various features may be configured, for example, a system enable/disable feature; an enable/disable feature for logging specific IDs/groups; and NAND flush policy.

Figure 10:
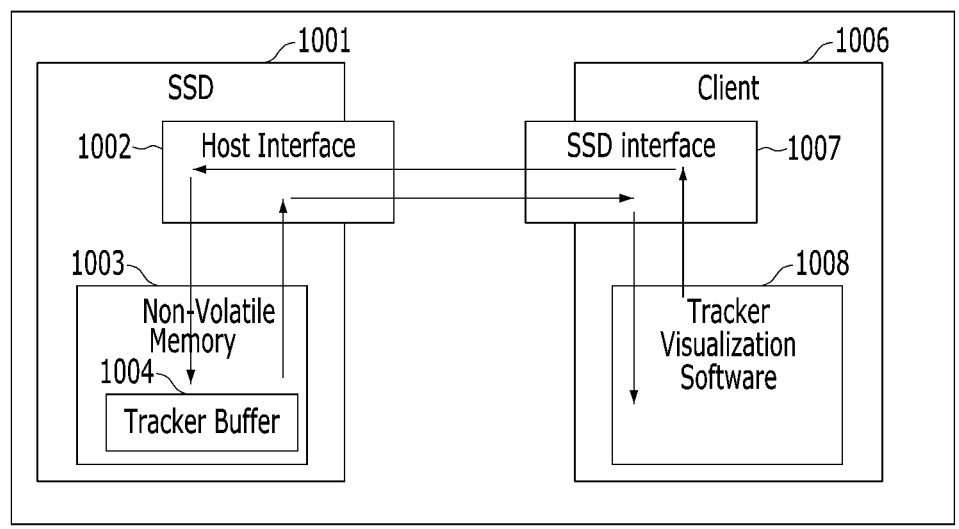
FIG. 10 is a schematic diagram showing a tracker buffer request from a client in accordance with an embodiment of the present invention.

FIG. 10 is a schematic diagram of a request of tracker buffer content from a client. An SSD 1001 includes a host interface 1002 and a non-volatile memory 1003 in which the content of one or more tracker buffers, e.g., tracker buffer(s) 56, 57, is stored. Such content, which has been flushed from volatile memory, is represented by tracker buffer 1004.

The client 1006 includes an SSD interface 1007, which communicates according to the vendor specific protocol with the host interface 1002 of the SSD 1001. The client 1006 may also include tracker visualization software 1008, from which the request is initiated. The tracker visualization software 1008 may be configured to display the event-items 42 and details thereof in a human readable way.

Figure 11:
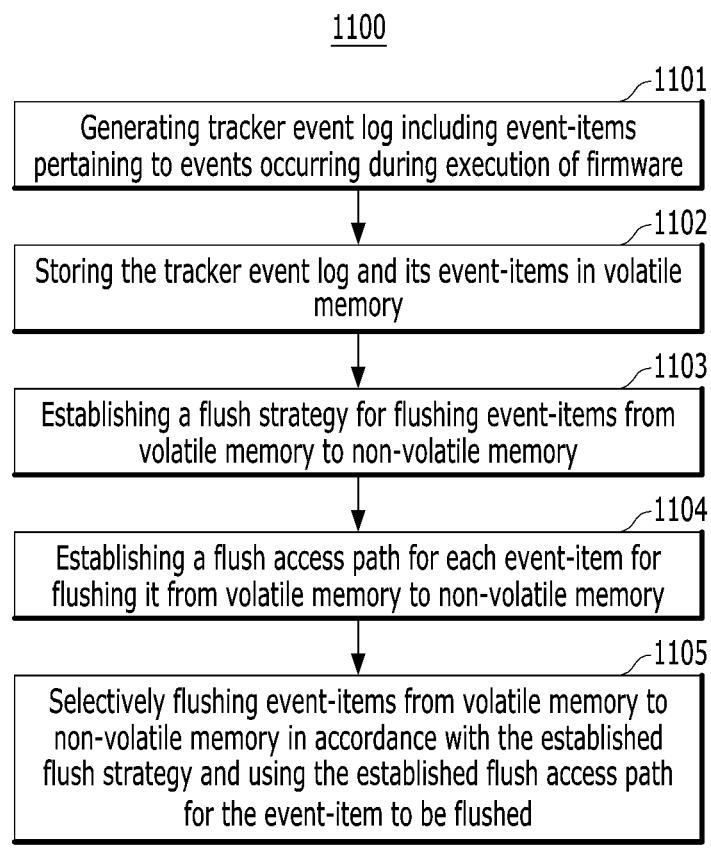
FIGS. 11-13 are flowcharts of steps of methods for tracking events in firmware and using a firmware event tracker, and in particular tracker event log information, in accordance with embodiments of the present invention.
Figure 12:
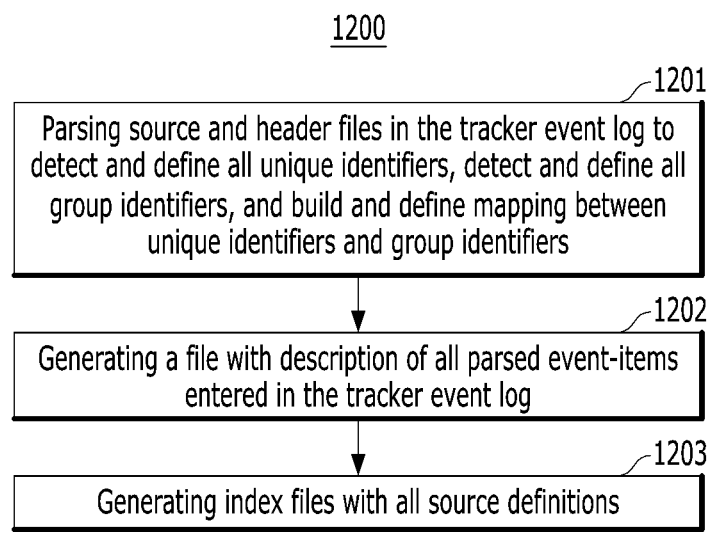
Figure 13:
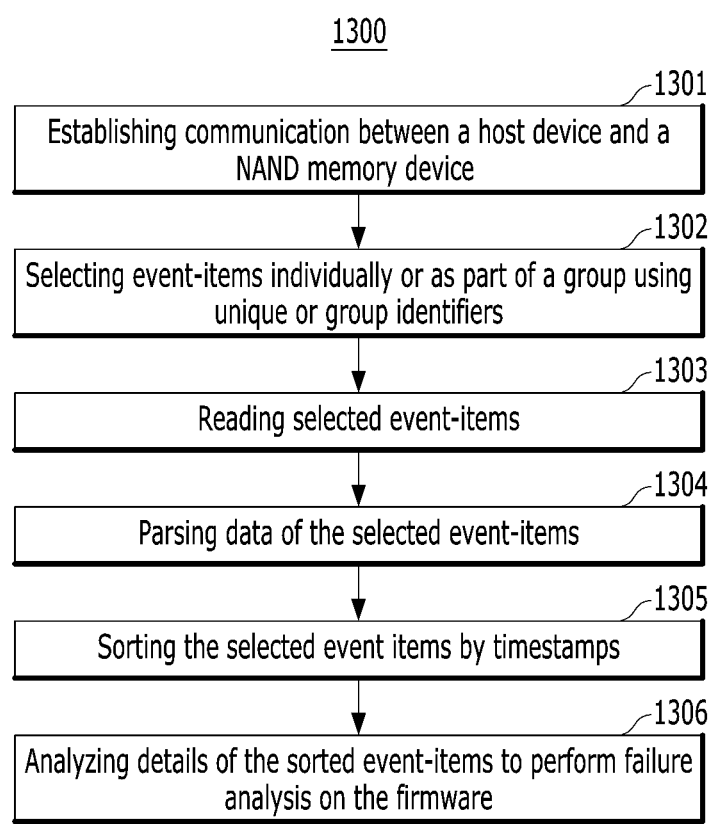

FIGS. 11-13 are flow charts describing steps in processes for tracking events in firmware and using a firmware event tracker, and in particular tracker event log information, in accordance with embodiments of the present invention. The steps shown in the flow chart are exemplary. Those skilled in the art will understand that additional or alternative steps may be performed, or that the order of the steps may be changed, in order to effectuate aspects of the present invention without departing from the inventive concepts disclosed herein. The steps of flow charts may be performed by any suitable component(s) in accordance with the teachings herein.

FIG. 11 is a flow chart illustrating tracking events in firmware. Referring to FIG. 11, at step 1101, a tracker event log 41 including event-items 42 pertaining to events occurring during execution of the firmware is generated. The tracker event log 41 including its event-items 42 are stored in volatile memory in step 1102. At step 1103, a flush strategy or policy is established for flushing the event-items 42 from the volatile memory 53 to the non-volatile memory 54. A flush access path for each of the event-items for flushing the corresponding event-item from the volatile memory 53 to the non-volatile memory 54 is established at step 1104. At step 1105, an operation of selectively flushing event-items from the volatile memory 53 to the non-volatile memory 54 in accordance with the established flush strategy and using established flush access path for the event-item to be flushed is performed.

FIG. 12 is a flow chart illustrating an aspect of using the firmware event tracker 40 in which event-items have been recorded in a tracker event log. In particular, FIG. 12 shows an embodiment of the prebuild script process. At step 1201, source and header files in the tracker event log 41 are parsed to detect and define all unique identifiers, detect and define all group identifiers, and build and define mapping between unique identifiers and group identifiers. Then, at step 1202, a file with description of all parsed event-items 42 entered in the tracker event log 41 is generated. Index files with all source definitions are generated at step 1203.

FIG. 13 is a flow chart illustrating another aspect of using the firmware event tracker 40 to analyze firmware. In this embodiment, a host device performs failure analysis of firmware using the tracker event log 41, which is stored in NAND memory device. At step 1301, communication is established between the host device and the NAND memory device. Next, at step 1302, individual event-items 42 in the tracker event log 41 are selected using their respective unique identifiers, or group(s) of event-items are selected using their respective group identifiers. The selected event-items or group(s) of event-items are read at step 1303. An operation of parsing data of the selected event-items 42 or the selected group(s) of event-items 42 is performed at step 1304. The data can be parsed with an index file generated in operation 94 (of FIG. 9). The event-items 42 selected individually or as part of a group are sorted by timestamps at step 1305. The details of the sorted event-items 42 are then analyzed to perform FA on the firmware at step 1306.

As the foregoing describes, embodiments of the present invention provide an improved firmware event tracker and methods for using the same, particularly in connection with NAND-based storage devices. The firmware event tracker and related methods enhance FA of supplier and customer side issues.

Although the foregoing embodiments have been described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. A non-transitory computer-readable storage medium storing a set of instructions for directing a device to perform operations for tracking events with respect to firmware, the set of instructions comprising instructions for:

creating a tracker event log including a plurality of event-items pertaining to events occurring during execution of the firmware, each of the event-items including a timestamp, a unique identifier and at least one parameter describing the corresponding event, each of the event-items being associated with an event in a specific one of multiple cores of the device;

storing each of the event-items in a main tracker buffer in volatile memory for the associated core, the volatile memory including multiple main tracker buffer and auxiliary tracker buffer pairs for the multiple cores, respectively;

establishing a flush strategy for flushing event-items from the volatile memory to non-volatile memory;

establishing a flush access path for each of the event-items for flushing the corresponding event-item from the corresponding main tracker buffer in the volatile memory to the non-volatile memory via an associated one of the multiple auxiliary tracker buffers in the volatile memory to enable the main tracker buffer to continue to store event-items during the flushing operation; and selectively flushing event-items from the volatile memory to the non-volatile memory in accordance with the established flush strategy and using the established flush access path for the event-item to be flushed, wherein each of the multiple cores is associated with a respective one of the multiple main tracker buffers and a respective one of the auxiliary tracker buffers.

2. The non-transitory computer-readable storage medium of claim 1, wherein the at least one parameter includes five custom parameters.

3. The non-transitory computer-readable storage medium of claim 1, wherein the storing of the event-items is carried out in accordance with an array-based list structure that comprises a unidirectional linked list in which each entry has a header with entry length and a pointer to a next entry in the list.

4. The non-transitory computer-readable storage medium of claim 1, wherein the flush strategy is based on at least one of degree of fullness of the volatile memory, occurrence of a critical event and user request.

5. The non-transitory computer-readable storage medium of claim 1, wherein the non-volatile memory comprises a NAND memory device having a plurality of blocks, each having a plurality of pages, and the selectively flushing of the event-items from the volatile memory to the NAND memory device comprises storing the event-items of the tracker event log block-by-block, page-by-page.

6. A non-transitory computer-readable storage medium storing a set of instructions for using a firmware event tracker stored in a multi-core NAND device and that includes a plurality of event-items pertaining to events that occurred during execution of firmware in a storage device, each of the event-items including a timestamp, a unique identifier and at least one parameter describing the corresponding event, the event-items being arranged in groups in association with the respective cores in which the corresponding events occurred, each group having its own group identifier to identify the core with which the group is associated, the set of instructions comprising instructions for:

parsing source and header files in the tracker event log to detect and define all unique identifiers, detect and define all group identifiers, and build and define mapping between unique identifiers and group identifiers;

generating a file with description of all parsed event-items entered in the tracker event log, such that each event-item is identified with the core in which the corresponding event occurred; and generating index files with all source definitions, wherein the multiple cores of the NAND memory device are associated with multiple main tracker buffer and auxiliary tracker buffer pairs, respectively, and each of the multiple cores of the NAND device is associated with a respective main tracker buffer and auxiliary tracker buffer pair, among the multiple main tracker buffer and auxiliary tracker buffer pairs, for storing event-items for events that occurred in the corresponding core.

7. The non-transitory computer-readable storage medium of claim 6, wherein the mapping between the unique identifiers and the group identifiers comprises a sparse matrix.

8. The non-transitory computer-readable storage medium of claim 6, wherein the mapping between the unique identifiers and the group identifiers provides for selectively enabling/disabling one or unique identifiers and one or more group identifiers when performing failure analysis of the firmware using the tracker event log.

9. The non-transitory computer-readable storage medium of claim 8, wherein the mapping between the unique identifiers and the group identifiers provides for changing a flush policy directing when to flush event-items from a volatile memory to a non-volatile memory when performing failure analysis of the firmware using the tracker event log.

10. A non-transitory computer-readable storage medium storing a set of instructions for directing a host device to perform failure analysis of firmware using a firmware event tracker stored in a multi-core NAND memory device and that includes a plurality of event-items pertaining to events that occurred during execution of firmware in a storage device, each of the event-items including a timestamp, a unique identifier and at least one parameter describing the corresponding event, the event-items being arranged in groups in association with the respective cores in which the corresponding events occurred, each group having its own group identifier to identify the core with which the group is associated, the set of instructions comprising instructions for:

establishing communication between the host device and the NAND memory device;

selecting some but not all individual event-items using their respective unique identifiers or one or more groups of event-items using their respective group identifiers, the selected individual event-items being deemed relevant to a particular issue to be addressed through failure analysis;

reading the selected event-items;

parsing data of the selected event-items;

sorting the selected event-items by timestamps; and analyzing details of the sorted event-items to perform failure analysis on the firmware, wherein the multiple cores of the NAND memory device are associated with multiple main tracker buffer and auxiliary tracker buffer pairs, respectively, and each of the multiple cores of the NAND memory device is associated with a respective main tracker buffer and auxiliary tracker buffer pair, among the multiple main tracker buffer and auxiliary tracker buffer pairs, for storing event-items for events that occurred in the corresponding core.

\* \* \* \* \*